(12) United States Patent
Nienstermann et al.

(10) Patent No.: US 12,063,879 B2
(45) Date of Patent: Aug. 20, 2024

(54) ADHESIVE MAT AND USE OF AN ADHESIVE MAT FOR DETERMINING A DISTRIBUTION OF AGRICULTURAL SCATTERING MATERIAL BY IMAGING

(71) Applicant: AMAZONEN-WERKE H. DREYER SE & Co. KG, Hasbergen (DE)

(72) Inventors: Heinke Nienstermann, Osnabrück (DE); Rainer Hofter, Bissendorf (DE)

(73) Assignee: Amazonen-Werke H. Dreyer SE & Co. KG (DE)

( * ) Notice: Subject to any disclaimer, the term of this patent is extended or adjusted under 35 U.S.C. 154(b) by 652 days.

(21) Appl. No.: 16/483,258

(22) PCT Filed: Jan. 30, 2018

(86) PCT No.: PCT/EP2018/052201
§ 371 (c)(1),
(2) Date: Aug. 2, 2019

(87) PCT Pub. No.: WO2018/141709
PCT Pub. Date: Aug. 9, 2018

(65) Prior Publication Data
US 2020/0000015 A1    Jan. 2, 2020

(30) Foreign Application Priority Data

Feb. 2, 2017 (DE) .......................... 102017102013.6

(51) Int. Cl.
A01C 17/00    (2006.01)
A01C 21/00    (2006.01)

(52) U.S. Cl.
CPC .......... *A01C 17/008* (2013.01); *A01C 21/005* (2013.01)

(58) Field of Classification Search
CPC ................ A01C 17/008; B05B 12/084; G01N 2021/0339
See application file for complete search history.

(56) References Cited

U.S. PATENT DOCUMENTS

| | | | |
|---|---|---|---|
| 6,177,165 B1 * | 1/2001 | Robbins, III | B29C 48/35 428/80 |
| 6,340,513 B1 * | 1/2002 | Hammond | B32B 27/12 428/95 |
| 6,580,060 B1 * | 6/2003 | Inman | B60N 2/5657 219/217 |

(Continued)

FOREIGN PATENT DOCUMENTS

| | | |
|---|---|---|
| DE | 870 167 C | 3/1953 |
| DE | 10 2004 017075 A1 | 11/2005 |

(Continued)

OTHER PUBLICATIONS

International Search Report and Written Opinion issued in PCT/EP2018/052201 mailed Mar. 16, 2018.

(Continued)

*Primary Examiner* — Alicia Torres
(74) *Attorney, Agent, or Firm* — Mintz Levin Cohn Ferris Glovsky and Popeo, P.C.

(57) ABSTRACT

An adhesive mat for determining a distribution of agricultural spreading material by imaging, includes: a collecting region which is bordered on one side by an edge region, where the edge region includes a passage opening and/or a handle.

8 Claims, 2 Drawing Sheets

(56) References Cited

U.S. PATENT DOCUMENTS

Figure 1:
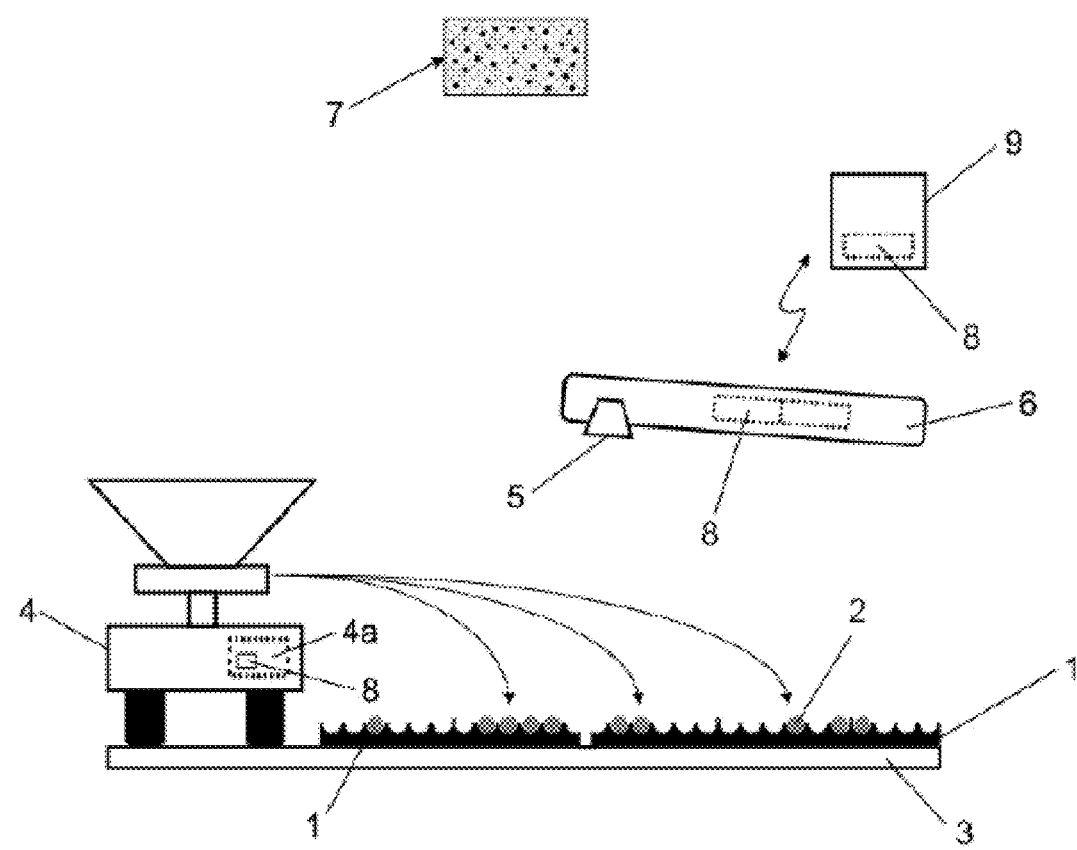

| | | | |
|---|---|---|---|
| 7,462,142 B1* | 12/2008 | Gordon | A63B 21/4037 |
| | | | 482/142 |
| 2007/0066467 A1 | 3/2007 | Edwards | |
| 2013/0049275 A1* | 2/2013 | Morgan | A47J 47/005 |
| | | | 269/14 |
| 2013/0256963 A1* | 10/2013 | Shofet | A47J 47/005 |
| | | | 269/15 |
| 2013/0269112 A1* | 10/2013 | Legare | A47G 9/062 |
| | | | 5/648 |
| 2017/0223279 A1* | 8/2017 | Mueller | G06T 7/80 |
| 2017/0251638 A1* | 9/2017 | Staloch | A01K 19/00 |

FOREIGN PATENT DOCUMENTS

| | | | | |
|---|---|---|---|---|
| DE | 10 2014 103964 A1 | 9/2015 | | |
| EP | 2 924 417 A2 | 9/2015 | | |
| EP | 2957161 A1 * | 12/2015 | | A01C 17/008 |
| EP | 3351083 A1 * | 7/2018 | | A01C 17/008 |
| UA | 55538 C2 | 4/2003 | | |

OTHER PUBLICATIONS

European Search Report issued Jan. 18, 2021 in corresponding European Patent Application No. 20202702.5.

Ukraine Office Action dated Sep. 22, 2021 in corresponding Ukraine Application No. a 2019 09536.

* cited by examiner

ADHESIVE MAT AND USE OF AN ADHESIVE MAT FOR DETERMINING A DISTRIBUTION OF AGRICULTURAL SCATTERING MATERIAL BY IMAGING

The invention relates to an adhesive mat for determining the distribution of agricultural scattering material, as well as the use of an adhesive mat for determining a distribution of agricultural spreading material by imaging.

Generic methods and adhesive mats for determining the distribution of fertilizer grains, in particular transverse to the direction of travel of a fertilizer spreader, are known, for example, from DE 10 2014 103 964 A1. According thereto, adhesive mats or boards are first laid out to collect and retain spread fertilizer grains. The fertilizer grains are then spread with a fertilizer spreader travelling over a ground region covered with adhesive mats or boards. The bestrewed adhesive mats are then imaged in at least one digital camera image. Finally, the fertilizer grains are localized in the camera image and an actual distribution of the fertilizer grains on the adhesive mats is calculated. This actual distribution can then be compared to a desired distribution and the result can be used to adjust the distribution members.

It has been found that handling such adhesive mats can be impractical, especially when working on arable land. For example, it is difficult for one person to transport several adhesive mats at the same time, so that a large number of trips is necessary between the agricultural vehicle in which the adhesive mats are stored and the places where the adhesive mats are to be laid out. In addition, carrying, laying out and picking up the adhesive mats can be impractical.

The object of the invention is therefore to provide adhesive mats which are easy to handle, in particular when used on arable land.

The object set is satisfied with an adhesive mat according to claim 1. Further advantageous embodiments of the invention are disclosed in the dependent claims.

An adhesive mat is herein to be understood as being a planar element which is made, in particular, of a flexible material. For example, it can be made of plastic material. The plastic material can be, in particular, a thermoplastic elastomer. The adhesive mat can extend substantially in one plane, where the extension in this plane (length, width) is many times greater than in a direction perpendicular to this plane (thickness). The adhesive mat can basically have any geometric shape; it is preferably formed to be cuboid.

According to the invention, the adhesive mat comprises a collecting region which is at least in part bordered at least on one side by an edge region. According to one alternative, the edge region is provided with a passage opening. This allows, in particular, easy transport of several adhesive mats which are connected to each other, for example, by way of their respective openings, and can thusly be carried together. Furthermore, there is the advantage that several adhesive mats can be suspended simultaneously for storage from a suitable holder, such as a hook. Alternatively or additionally, the edge region of the adhesive mat can also comprise a handle, where the handle enables gripping the adhesive mat with one hand. In a particularly advantageous embodiment of the invention, the passage opening itself can be formed such that it can be used as a handle. The handle can also be formed by an element which, for example, is formed to be loop-shaped perpendicular to the plane in which the adhesive mat extends substantially.

The adhesive mat can preferably be formed in one piece, i.e., the edge region of the adhesive mat confines the collecting region of the adhesive mat on at least one side solely by its formation. This can be achieved in that the edge region is structured to be raised or lowered relative to the collecting region, i.e. the edge region has a thickness that differs from the collecting region, or in that its surface or material nature (for example, density or material) is different from that of the collecting region. In particular, the edge region can completely confine the collecting region on all sides and thus form a "frame" around the collecting region.

The collecting region can comprise a plurality of knob-like elevations which are arranged in a grid in the collecting region. This provides the advantage that a large number of collecting spaces, in particular of equal size, are formed by the elevations, in which the grains of the spreading material can be retained at the points where they impinge on the adhesive mat. The knob-like elevations can have the shape, for example, of rods, tongues, hooks or the like extending from the surface of the mat.

The collecting region can further comprise at least one marking. Such a marking can be helpful in many ways in preparation for the recording of the adhesive mat with a camera. It can facilitate positioning of a digital camera, e.g. the camera of a smartphone, when recording the grain distribution, or enable, by a particular coloration, color calibration of the camera or an application used for the evaluation of a camera image. In particular, the marking can have a known coloration that differs from the base color of the adhesive mat. The base color of the adhesive mat can be the color that is predominantly exhibited by the adhesive mat, in particular the collecting region.

The at least one marking can alternatively or additionally be formed by a recessed area in the grid of the knob-like elevations. For example, the marking can already be formed during the production process of the adhesive mat, which can ensure that the marking is uniform for all adhesive mats.

The collecting region of the adhesive mat can be formed to be rectangular in the plane in which the adhesive mat extends substantially, where a marking is applied in each corner of the adhesive mat. This is advantageous because the markings thereby allow the user to easily position the camera such that the collecting region optimally fills the digital camera image to be captured, i.e., that the entire collecting region and at the same time as little as possible of the edge region is recorded.

The passage opening can be formed to have an extension along one axis that is located in the plane in which the adhesive mat extends substantially of less than 350 mm and more than 90 mm, in particular less than 175 mm and more than 110 mm, and to have an extension along a second axis located in this plane of the adhesive mat, which is perpendicular to the first axis of less than 100 mm and more than 35 mm, in particular less than 60 mm and more than 40 mm. This configuration of the passage opening makes it possible to easily pick up, carry and lay out an adhesive mat with one hand.

The invention also provides the use of at least one adhesive mat described above for determining a distribution of agricultural spreading material by imaging according to claim 7.

The at least one adhesive mat can be arranged at a location on a field or a test area. Granular spreading material can subsequently be distributed over the adhesive mat from a spreader vehicle passing by the adhesive mat, which can be, in particular, a centrifugal spreader. Finally, the distribution of the spreading material on the adhesive mat can be determined by way of an imaging method. The actual distribution obtained in this way can then be compared to a desired distribution stored in a memory or otherwise provided, and the result of the comparison can be used for adjusting the distribution members of the distribution vehicle.

The passage opening can be used in the process as a handle for laying out or carrying the adhesive mat.

During the imaging process, the markings on the mat can be used to correctly position the camera.

The adhesive mat can have one or more of the features described above.

Figure 2:
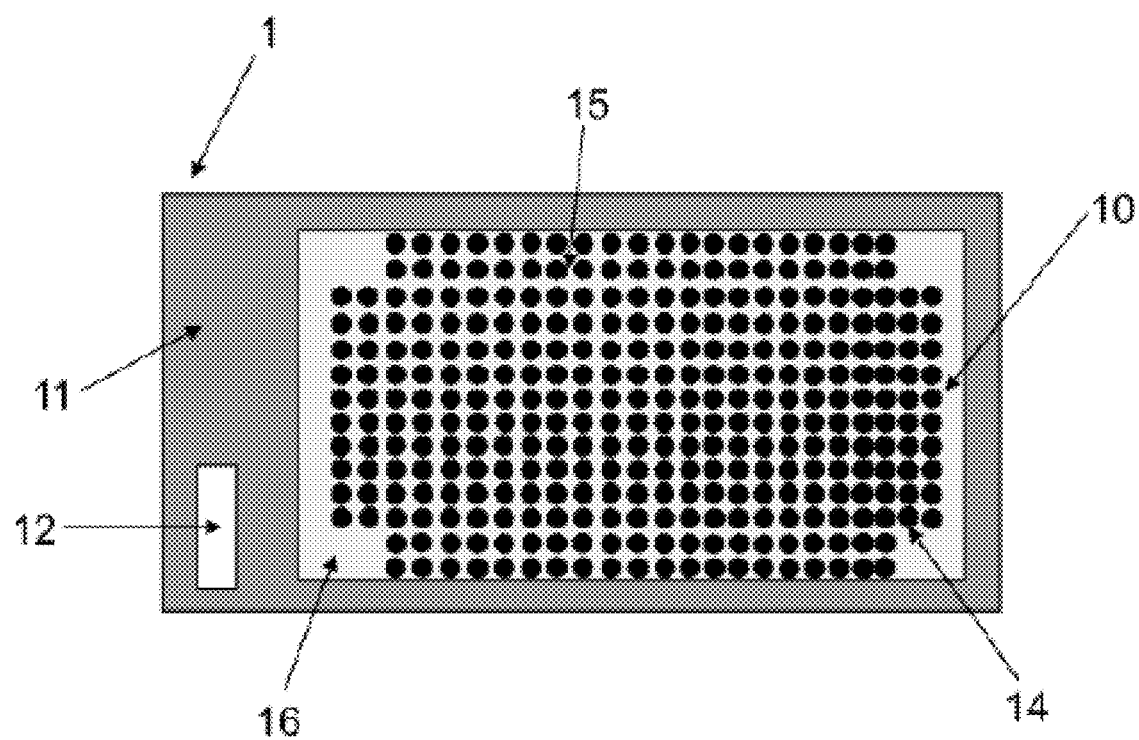

Further features of the present invention shall be illustrated below using the exemplary figures, where FIG. 1 shows a schematic representation of the use according to the inventive of an adhesive mat; and FIG. 2 shows a schematic representation of an adhesive mat according to the invention.

FIG. 1 schematically shows the use of an adhesive mat 1 for determining the distribution of agricultural spreading material by imaging on an area 3. At least one, but typically two or more, adhesive mats 1 are laid out on arable land, a field, a test area or the like. Subsequent thereto, an agricultural spreader vehicle 4, for example a centrifugal spreader, moves past the adhesive mats 1 and distributes the granular spreading material 2 over the area 3. Adhesive mats 1 described in more detail below are formed such that they retain granular spreading material 2 distributed in the region of adhesive mats 1 substantially at the locations where they impinge adhesive mats 1.

Once a portion of granular spreading material 2 has been distributed in this manner onto adhesive mats 1, an image 7 of the distribution of spreading material 2 on adhesive mats 1 is created by way of an image recording device 5, which can be, for example, a digital camera, in particular an integrated camera of a mobile radio device 6 (e.g. a smartphone). In particular, a separate image can be created for each adhesive mat 1 in the process.

Image 7 can then be evaluated in digital form by a processing unit 8 in order to determine an actual distribution of granular spreading material 2 on adhesive mat 1. According to one example, processing unit 8 as well as camera 5 are part of mobile radio device 6, so that the recording and evaluation can be performed with the same device. This eliminates the need to transfer images 7 to another device, which saves time and resources.

Alternatively, however, processing unit 8 can also be part of on-board computer 4a of spreader vehicle 4, or of a separate computer system 9. In this case, the transmission of images 7 takes place preferably by way of wireless communication between mobile radio device 6 and on-board computer 4a or computer system 9, respectively. Images 7 can also be transmitted by way of a cable, e.g. a USB cable, from mobile radio device 6 or directly from image recording device 5 to on-board computer 4 a or computer system 9.

Another option is to digitize a copy of image 7 by way of a scanner and to then transfer it to on-board computer 4a or computer system 9.

FIG. 2 schematically shows an adhesive mat 1 according to the invention. Adhesive mat 1 there comprises a collecting region 10 which is completely confined by an edge region 11. Adhesive mat 1 is there typically formed as one piece, and collecting region 10 is lowered relative to edge region 11. In other words, collecting region 10 forms a recess in adhesive mat 1, which is confined by edge region 11. The adhesive mat can also be designed differently, for example, the edge region and the collecting region could be formed by way of multi-component injection molding. In particular, the edge region can be made of polypropylene (PP) or polyethylene (PE) and the collecting region made of thermoplastic elastomer. External dimensions of the adhesive mat can be in the range of 550 mm to 700 mm for the length and in the range of 350 mm to 450 mm for the width. The thickness of edge region 11 can be in the range of 10 mm to 15 mm. The dimensions of collecting region 10 can be in the range of 500 mm to 650 mm for the length and in the range of 300 mm to 400 mm for the width. The thickness of the adhesive mat in collecting region 10 can be in the range of 3 mm to 6 mm.

In the embodiment shown in FIG. 2, edge region 11 has a passage opening 12 which here at the same time can be used as a handle. The dimensions of the passage opening 12 are chosen such that they allow adhesive mat 1 to be picked up and carried with one hand. The length of the passage opening can be in the range of 90 mm to 350 mm, preferably in the range of 110 mm to 175 mm, the width in the range of 35 mm to 100 mm, preferably in the range of 40 mm to 60 mm. Furthermore, such a configuration of passage opening 12 allows several adhesive mats 1 to be carried simultaneously with one hand. In this process, a user arranges adhesive mats 1 such that passage openings 12 come to lie one above the other, and then reaches through the resulting opening of all adhesive mats 1 at the same time with one hand.

Similarly, passage openings 12 can also be used to store a plurality of adhesive mats 1 in a space-saving manner, e.g. on a hook or a pole.

The collecting region of adhesive mat 1 contains knob-like elevations 14 which are arranged in a grid. Through elevations 14, a plurality of collecting spaces 15 are formed, in which granular spreading material 2 collects when using adhesive mat 1. The spacings of the grid are typically dimensioned such that the size of the collecting spaces 15 respectively corresponds approximately to the size of granular spreading material 2.

The clear widths of collecting spaces 15 can preferably be in the range of 2 to 5 mm. Thereby, granular spreading material 2, e.g. the grains of conventional types of fertilizer having grain sizes of, for example, 1 mm to 3 mm, can be collected in collecting spaces 15 individually and/or in suitably small groups of, for example, at most five grains of spreading material 2. Depending on the profile of elevations 14 protruding between collecting spaces 15, this results in advantageous grid spacings, i.e. spacings between the centers of elevations 14, of about 5 mm to 10 mm.

Knob-like elevations 14 can have a plurality of different profiles which promote the retention of granular spreading material 2. For example, elevations 14 can be in the shape of sticks or tongues, i.e. shapes that arise essentially by the extrusion of a circle or an ellipse, such as cylinders or cones with a circular or elliptical base. The height of elevations 14 can be in the range of 8 mm to 12 mm.

Adhesive mat 1 can be made of a material which is durable, easy to handle and flexible. In particular, the mat can be made of plastic material, for example, a thermoplastic elastomer. By choosing a suitable Shore A hardness and thickness of the mat, it can be ensured that the mat is easy to carry and stable, and can be well laid out even on uneven ground. For example, the Shore A hardness can be in the range of 60 to 90.

FIG. 2 also shows that collecting region 10 of adhesive mat 1 comprises markings 16. Markings 16 are formed in this embodiment by recesses in the grid of elevations 14 and arranged in the corners of collecting region 10. In particular such an arrangement makes it easier for the user in the use of adhesive mat 1 according to invention to position image recording device 5 such that collecting region 10 optimally fills captured image 7. Namely, camera 5 can then be positioned such that markings 16 appear exactly at the edge of the image in the viewfinder or on the screen of camera 5. That way, it can be ensured that, on the one hand, the entire collecting region 10 is imaged and, on the other hand, that the smallest possible part of edge region 11 or other parts of adhesive mat 1 appears on image 7. This facilitates the evaluation of image 7 by processing unit 8, since parts of adhesive mat 1 not relevant for the evaluation do not appear on image 7 to the extent possible, and image recognition is thus simplified.

The size of markings 16 is selected such that they are easy to recognize for the user when recording. The shapes and sizes for such markings can be, for example, squares having a side length of 30 mm to 40 mm.

Markings 16 can also be shaped and/or arranged differently. It is also conceivable that an application is executed on a mobile radio device 6 which recognizes a marking already during the preparation of the recording and suggests to the user to position camera 5 of mobile radio device 6 in a certain manner, for example, by appropriate instructions which are displayed to the user on the screen of camera 5. The application could know from a database the shape of adhesive mat 1 or marking 16 used and therefore also suggest the optimal position of camera 5 solely based on a marking 16. For example, the application could extract from the database that marking 16 for a given adhesive mat has the shape of an arrow which runs parallel to an edge of the collecting region. In addition, the application could have the information that marking 16 is arranged at a certain point of the collecting region, for example, in the center of the collecting region or at one of the four edges, where the edges "top", "bottom", "right" and "left" are defined by the direction of the arrow. The application could then query the user for the information of how the arrow is oriented, based on the arrangement of the adhesive mat in the field, relative to the direction of travel of spreader vehicle 4. Based on this, the application could then give the user instructions on how to position camera 5 so that e.g. the upper edge of a recorded image 7 always shows that edge of collecting region 10 which in the direction of travel is farther away. This would ensure that all recorded images 7 have the same orientation.

Markings 16 can further have a coloration that differs from the color of interior space 10 of adhesive mat 1. In particular, one or more of the markings can have a known coloration that can be used by processing unit 8 to color-calibrate image 7. This is advantageous for the reason that the use of adhesive mat 1 can take place under different ambient conditions, in particular at different light conditions. An image 7 taken on arable land in the open air can differ in hue from an image taken using an adhesive mat 1 in a test area on a factory floor, although the same adhesive mat 1 and the same spreading material were used.

It is understood that the features mentioned in the embodiments described above are not restricted to these specific combinations and are also possible in any other combination. In particular, the adhesive mat or its passage opening can have different shapes or geometries.

The invention claimed is:

1. Adhesive mat for determining a distribution of agricultural spreading material by imaging, the adhesive mat comprising:
   a collecting region which is at least in part confined at least on one side by an edge region,
   wherein the collecting region comprises a plurality of knob-like elevations which are arranged in a grid on said collecting region,
   wherein the plurality of knob-like elevations forms a plurality of collecting spaces,
   wherein the plurality of collecting spaces is configured to retain grains of the spreading material at the points where they impinge on the adhesive mat,
   wherein the collecting region further comprises at least one marking, and
   wherein the at least one marking is formed by recesses in the grid of the plurality of knob-like elevations.

2. The adhesive mat according to claim 1, where said at least one marking is formed by recesses in said grid of said plurality of knob-like elevations.

3. The adhesive mat according to claim 1, where said collecting region is formed to be rectangular and said at least one marking is arranged in each corner of said collecting region.

4. The adhesive mat according to claim 1, where said passage opening has an extension along one axis located in the plane of said adhesive mat between 90 mm and 350 mm, and said passage opening has an extension along a second axis located in the plane of said adhesive mat, which is perpendicular to the first plane, between 35 mm and 100 mm.

5. The adhesive mat according to claim 1, wherein the adhesive mat is configured to determine a distribution of agricultural spreading material by imaging.

6. The adhesive mat according to claim 5, wherein:
   said adhesive mat is arranged at a location on a field or test surface; and
   granular spreading material from a spreader vehicle passing said adhesive mat is spread over said adhesive mat,
   wherein a distribution of said spreading material on said adhesive mat is determined by an imaging method.

7. The adhesive mat according to claim 6, where the passage opening in said edge region of said adhesive mat is configured as a handle for carrying said adhesive mat.

8. The adhesive mat according to claim 1, where said at least one marking is used to determine the correct positioning of a camera.

* * * * *